United States Patent
Wang

(10) Patent No.: US 8,652,242 B2
(45) Date of Patent: Feb. 18, 2014

(54) DUST COLLECTION DEVICE

(76) Inventor: Chun-Hsiang Wang, Taichung (TW)

( * ) Notice: Subject to any disclaimer, the term of this patent is extended or adjusted under 35 U.S.C. 154(b) by 72 days.

(21) Appl. No.: 13/526,549

(22) Filed: Jun. 19, 2012

(65) Prior Publication Data

US 2013/0067874 A1    Mar. 21, 2013

(30) Foreign Application Priority Data

Sep. 20, 2011 (TW) .............................. 100217592 U

(51) Int. Cl.
*B01D 46/02* (2006.01)

(52) U.S. Cl.
USPC .................. 96/233; 55/302; 55/312; 55/313; 55/314; 55/341.1; 55/467; 55/471; 96/399

(58) Field of Classification Search
USPC ........ 55/359, 385.1, 283, 302, 356, 429, 413, 55/419, 337, 428, DIG. 18; 95/22, 55, 279, 95/280, 35; 96/55, 58, 63, 97, 57, 222, 96/223; 454/49; 312/1, 209, 211, 212, 312/229, 237
See application file for complete search history.

(56) References Cited

U.S. PATENT DOCUMENTS

| | | | | | |
|---|---|---|---|---|---|
| 3,906,756 | A | * | 9/1975 | Bone | 68/18 F |
| 4,036,614 | A | * | 7/1977 | DeMarco | 55/310 |
| 5,063,906 | A | * | 11/1991 | Rogers et al. | 126/299 D |
| 5,324,344 | A | * | 6/1994 | Broyan et al. | 95/25 |
| 5,958,112 | A | * | 9/1999 | Nojima | 96/55 |
| 7,686,860 | B2 | * | 3/2010 | Ryan | 55/429 |
| 2003/0182906 | A1 | * | 10/2003 | Chullanandana et al. | 55/283 |
| 2005/0274094 | A1 | * | 12/2005 | DeMarco | 55/356 |
| 2008/0168899 | A1 | * | 7/2008 | Decker | 95/22 |

* cited by examiner

*Primary Examiner* — Duane Smith
*Assistant Examiner* — Minh-Chau Pham
(74) *Attorney, Agent, or Firm* — Leong C. Lei

(57) ABSTRACT

A dust collection device includes a machine body that forms an air chamber and a chassis arranged below the machine body. The chassis receives therein a dust collection tank. A mechanics case that contains a motor and blower assembly is arranged at one side of the machine body. The mechanics case includes a partition board to divide the mechanics case into an inlet flow channel communicating the air chamber and an outlet flow channel for discharging air. The partition board forms an air vent hole in communication with the outlet flow channel. A block unit is provided on the partition board and includes a block plate that selectively blocks the air vent hole. When a fire occurs inside the air chamber, the partition board prevents the fire flame from being drawn into the mechanics case, and the block plate timely blocks the air vent hole to improve operation safety.

7 Claims, 7 Drawing Sheets

DUST COLLECTION DEVICE

(a) TECHNICAL FIELD OF THE INVENTION

The present invention generally relates to a dust collection device, and more particularly to a dust collection device that shows enhanced operation safety and protection of components thereof against damages caused by for example a fire of the dust collected.

(b) DESCRIPTION OF THE PRIOR ART

A conventional dust collection device generally comprises a machine body that forms therein an air chamber. The air chamber receives therein filter cans to filter off dusts contained in air. A dust collection tank is arranged below the machine body for collecting dust. Further, the dust collection device comprises a mechanics case at one side of the machine body for receiving and retaining therein a motor and blower assembly. When the motor and blower assembly is put into operation, a suction force is induced to draw air that contains dust into the air chamber of the machine body and the air passes through the filter cans to have the dust filtered off and falling down into the dust collection tank. The filtered air is then released to the outside.

However, some dusts are of flammability and may generate spark when colliding each other that may lead to accidents, such as fire and air blast. Once a fire or air blast is cause, due to the inertia of operation of the motor blower, oxygen is still in supply from the outside that even expands the fire. The fire flame may also be sucked by the motor and blower assembly into a mechanics compartment thereby causing damage to mechanical and electrical components. Even through water sprinkling is initiated for fire fighting, the water that extinguishes the fire may be sucked into the mechanics compartment and also causes damage of the internal components. This expands the loss caused by damage. Apparently, the conventional dust collection device does not suit the need of safety and security and must be improved.

SUMMARY OF THE INVENTION

Thus, a primary objective of the present invention is to provide a dust collection device that can effectively protect electrical and mechanical components to reduce damages and also improves the overall safety of operation.

Another objective of the present invention is to provide a dust collection device that realizes overall safety through a compact design of space utilization and thus satisfying the need of volume reduction.

A further objective of the present invention is to provide a dust collection device that eliminates undesired interference with air flows and can effectively put off fire to thereby improve overall safety.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
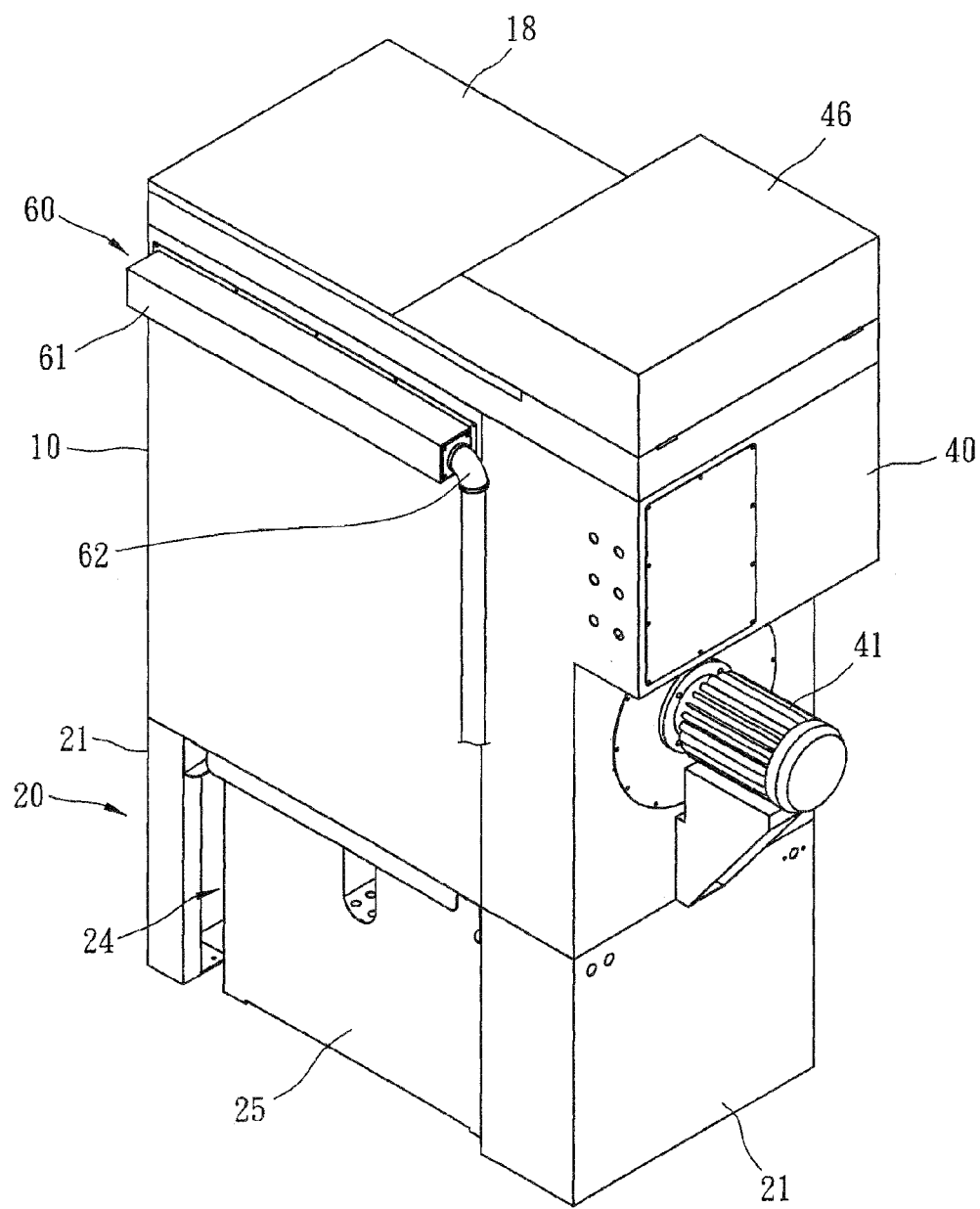
FIG. 1 is a perspective view of the present invention.
Figure 2:
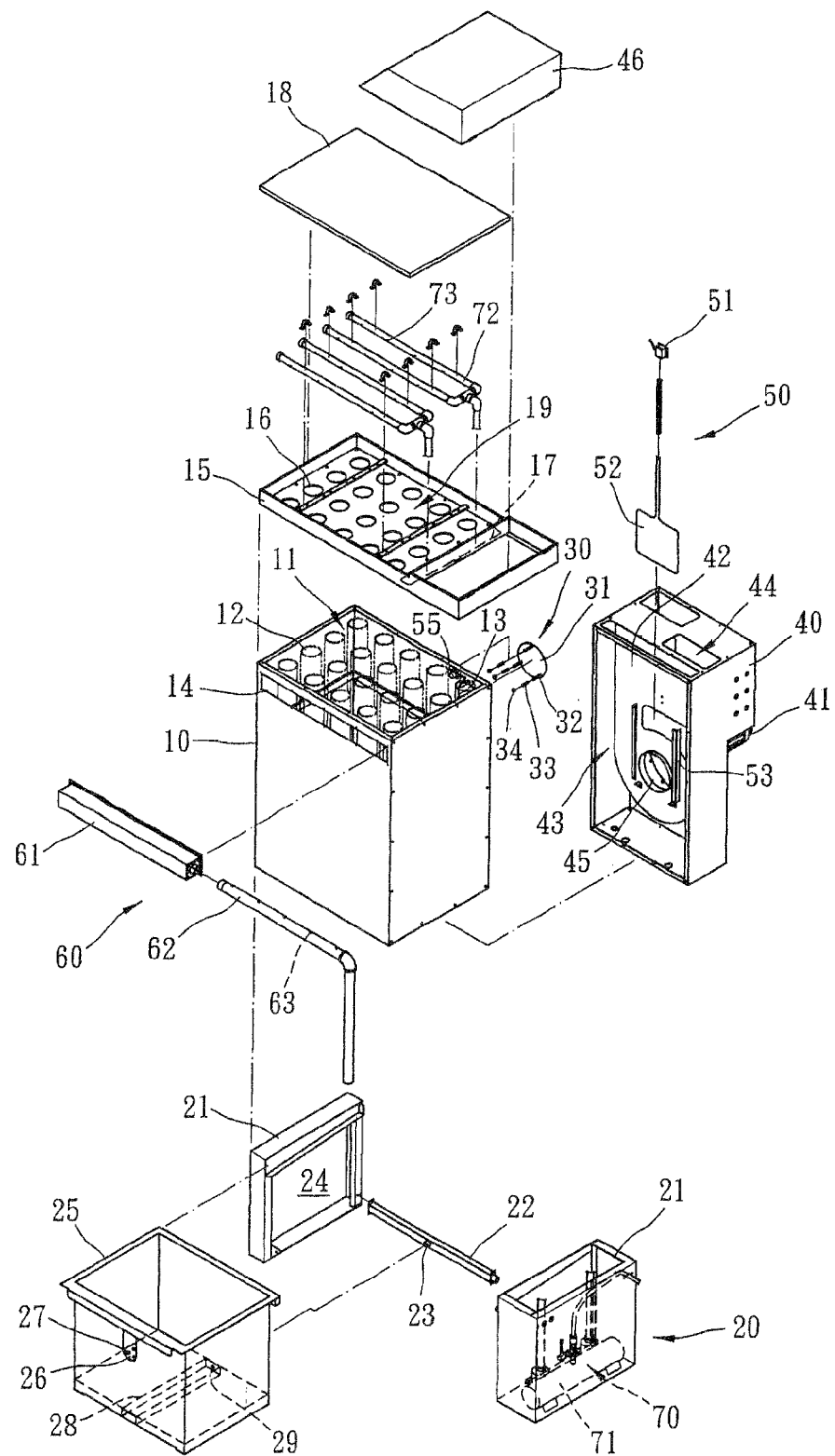
FIG. 2 is an exploded view of the present invention.
Figure 3:
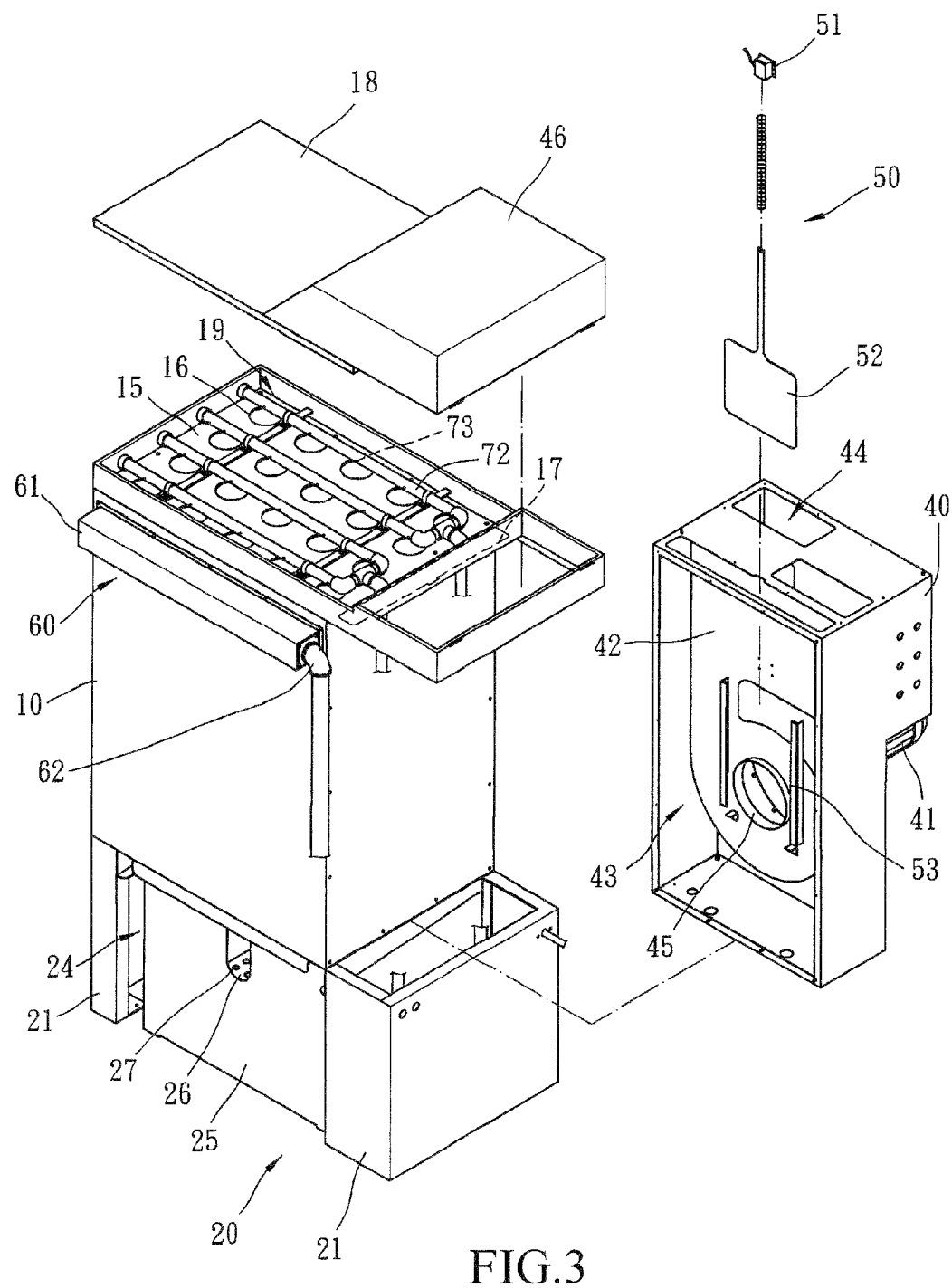
FIG. 3 is another exploded view of the present invention.

As shown in FIGS. 1, 2, and 3, the present invention provides a dust collection device, which comprises a machine body 10, a chassis 20, and a mechanics case 40.

The machine body 10 forms therein an air chamber 11, and a plurality of filter cans 12 is arranged inside the air chamber 11. The machine body 10 forms at least one through hole 13 in communication with the air chamber 11 and the through hole 13 receives a pressure relief unit 30 mounted therein for pressure relief purposes. Further, the machine body 10 forms in a side wall an opening 14 adjacent to an upper edge thereof and in communication with the air chamber 11 and the opening 14 receives a fire extinguisher unit 60 mounted therein for extinguishing fire occurring inside the air chamber 11. The machine body 10 has a top to which an upper spacer board 15 is mounted to close the air chamber 11 and forms air holes 16 corresponding to the filter cans 12 of the air chamber 11. The upper spacer board 15 has a side portion forming an air guide passage 17 corresponding to the mechanics case 40. Further, the upper spacer board 15 is covered by a top board 18 arranged thereon so that the upper spacer board 15 defines an air conduction chamber 19 in communication with the air chamber 11 and the mechanics case 40 and air inside the air chamber 11 is allowed to flow through the air conduction chamber 19 into the mechanics case 40. The air conduction chamber 19 receives therein a cleaner unit 70 for cleaning dust off the filter cans 12.

The chassis 20 is set under the machine body 10. The chassis 20 comprises two side supports 21 arranged below the machine body 10 and the two side supports 21 define therebetween a receiving space 24. The receiving space 24 receives therein a dust collection tank 25. A guide tube 22 is arranged between the two side supports 21. The guide tube 22 has an air inlet connector 23 corresponding to the dust collection tank 25. Further, the dust collection tank 25 has an inner bottom surface on which a lower spacer board 26 is mounted. The lower spacer board 26 forms a plurality of through apertures 27. An air guide trough 28 is formed below the lower spacer board 26 and the air guide trough 28 comprises a coupling hole 29 corresponding to the air inlet connector 23, whereby with the dust collection tank 25 received in the receiving space 24, the coupling hole 29 is coupled to the air inlet connector 23, so that when air is drawn in, a dust collection bag received in the dust collection tank 25 may have a bottom thereof expanding downward to allow the dust collection bag to receive dust and also to increase the collection capacity thereof.

The mechanics case 40 is arranged at one side of the machine body 10. The mechanics case 40 is provided for receiving mechanical and electrical components therein and comprises a motor and blower assembly 41. Further, the mechanics case 40 comprises a partition board 42 that is arranged at one side of the motor and blower assembly 41 facing the machine body 10. The mechanics case 40 is divided by the partition board 42 into an inlet flow channel 43 and an outlet flow channel 44. The inlet flow channel 43 corresponds to the air guide passage 17 and the outlet flow channel 44 corresponds to a mechanics compartment of the mechanics case 40 that receives the motor and blower assembly 41 and mechanical and electrical components. The partition board 42 forms an air vent hole 45 communicating between the inlet flow channel 43 and the outlet flow channel 44. The mechanics case 40 comprises an air exhaust assembly 46 mounted to a top thereof and communicating with the outlet flow channel 44. Further, the partition board 42 comprises a block unit 50 mounted thereto and the block unit 50 selectively block the air vent hole 45.

The pressure relief unit 30 comprises a cover plate 31 that covers the through hole 13. The cover plate 31 has a circumferential edge to which guide pins 32 are mounted to extend into the interior of the machine body 10. Each of the guide pins 32 has an end extending into the machine body 10 and carrying an engagement member 34 to retain a return elastic member 33 encompassing the pin, whereby the return elastic member 33 is supported between an inside surface of the machine body 10 corresponding to the air chamber 11 and the engagement member 34, so that the cover plate 31 is biased by the return elastic members 33 to forcibly position on an outside surface of the machine body 10 and the cover plate 31 is tightly and uniformly positionable to close the through hole 13. As such, when the internal pressure of the air chamber 11 exceeds the biasing forces of the return elastic members 33, the cover plate 31 can be timely pushed off to realize relief of pressure.

The block unit 50 comprises a block plate 52, which is operated by a driving element 51 to selectively block the air vent hole 45. Further, two rails 53 are respectively set at opposite sides of the air vent hole 45 to guide a smooth and stable movement of the block plate 52 vertically. Further, the air chamber 11 receives therein a detection element 55 that is coupled to the driving element 51 to immediately signal, whenever detecting a fire or air blast inside the air chamber 11, the driving element 51 to operate the block plate 52 blocking the air vent hole 45 and thus cutting off supply of oxygen and preventing fire, humidity, or harmful substances from entering the mechanics compartment of the mechanics case 40.

The fire extinguisher unit 60 comprises a shade 61 outside the opening 14 and the shade 61 receives therein a liquid conduction tube 62 in fluid communication with a water supply. The liquid conduction tube 62 comprises a plurality of nozzles 63, whereby when the detection element 55 detects a fire or air blast inside the air chamber 11, the fire extinguisher unit 60 is activated to cause the liquid conduction tube 62 that is located at an upper edge of the side wall of the air chamber to eject water for extinguishing the fire.

The cleaner unit 70 comprises a pressurized air supply 71 arranged inside the side supports 21. The air conduction chamber 19 comprises therein air ducts 72 connected to the pressurized air supply 71. The air ducts 72 form spray openings 73 corresponding to the air holes 16 to conduct pressurized air into the filter cans 12 that are arranged to correspond to the air holes 16 to blow off the dust attached to outside surfaces of the filter cans 12.

As such, a compact and highly safe structure of dust collection device is formed that can reduce potential risk of damages.

Figure 4:
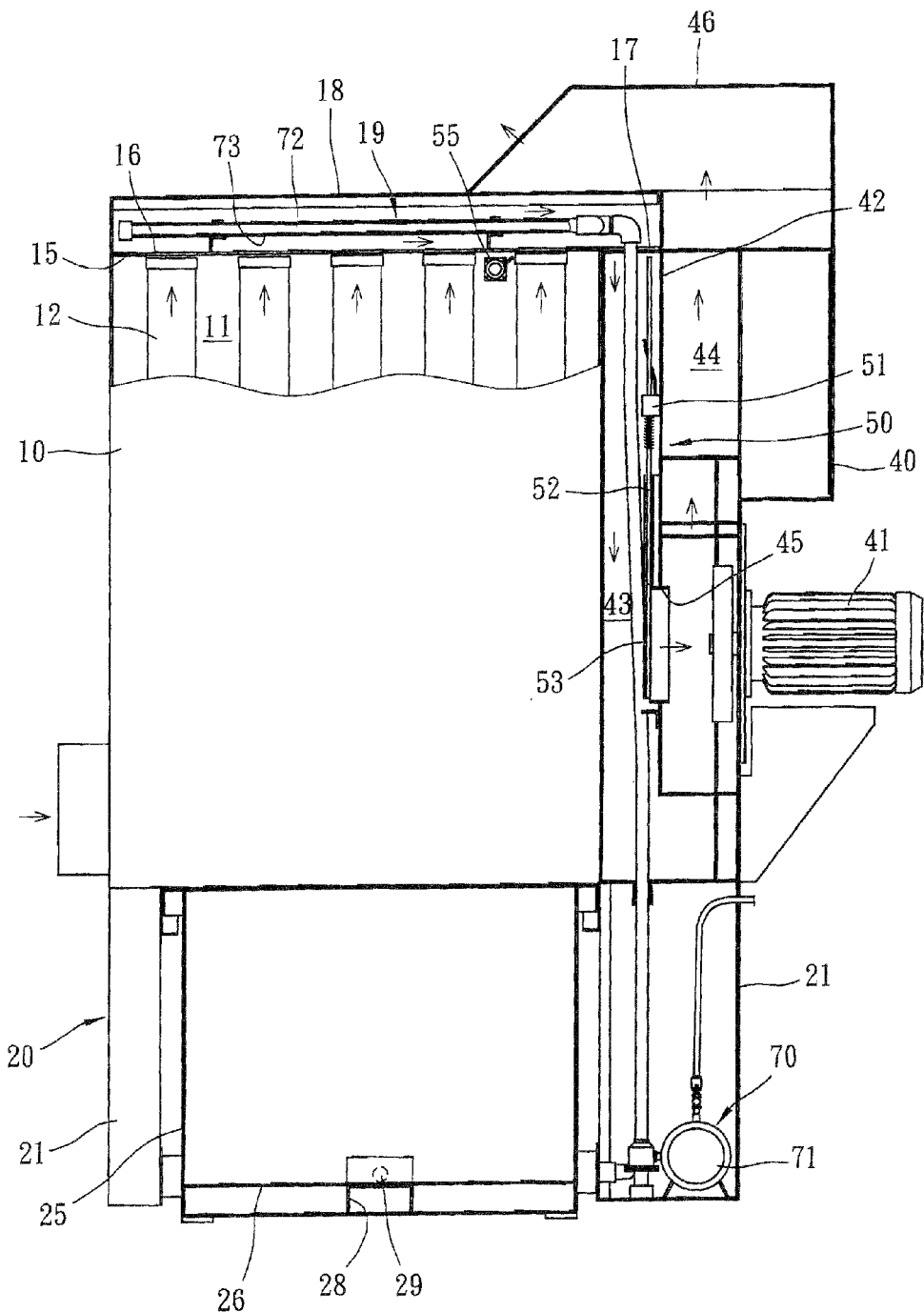
FIG. 4 is a side elevational cross-sectional view of the present invention in a practical use.

As shown in FIG. 4, when the motor and blower assembly 41 is activated, outside air that contains dusts are drawn into the air chamber 11 and is filtered by the filter cans 12 to supply clean air flowing through the filter cans 12 into the air conduction chamber 19, and further flowing through the air guide passage 17 into the inlet flow channel 43, passing through the air vent hole 45 into the outlet flow channel 44 to be discharged outward through the air exhaust assembly 46.

Figure 5:
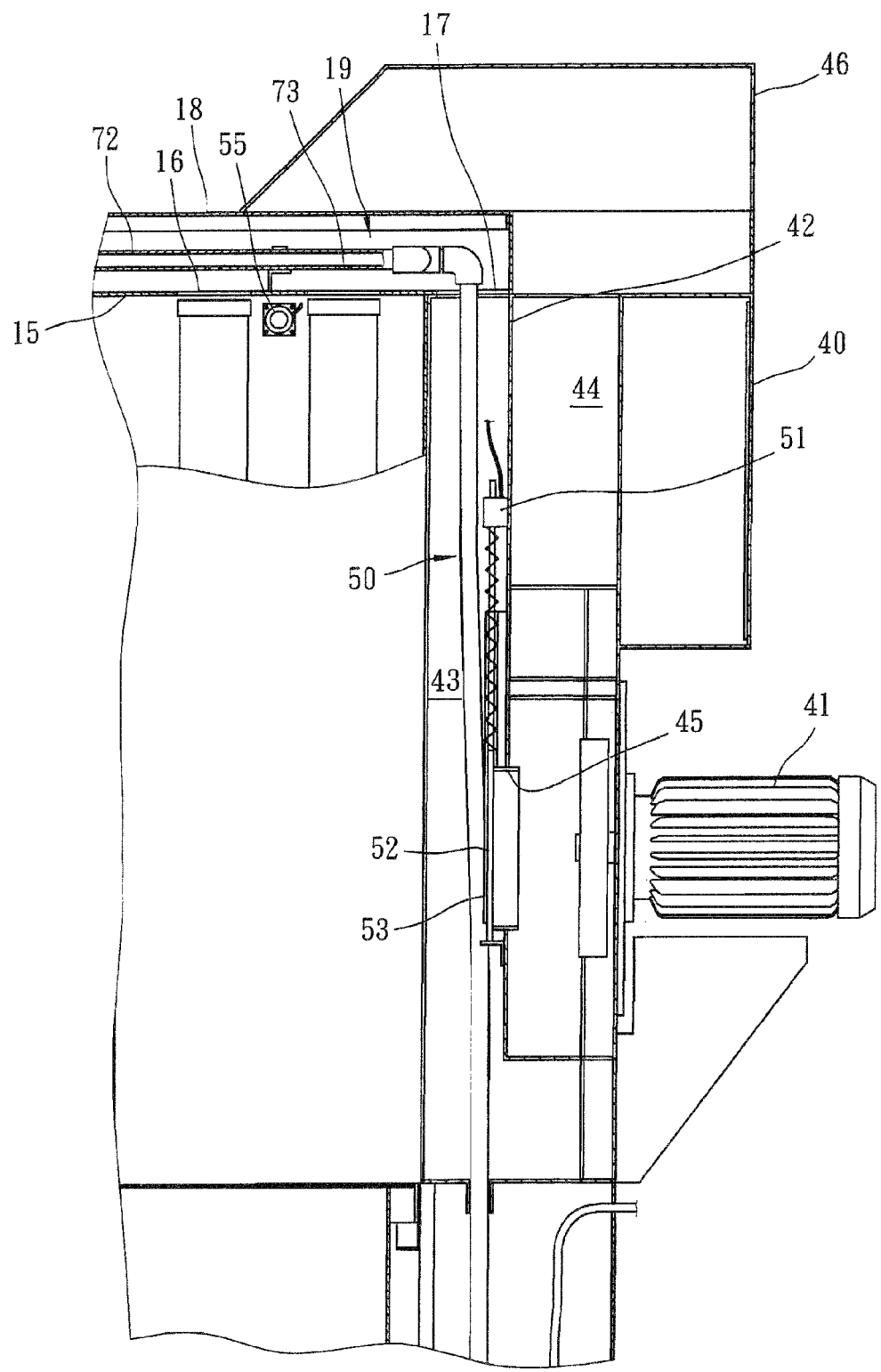
FIG. 5 is a partial cross-sectional view of the present invention, illustrating a condition thereof where air flow is blocked.

As shown in FIG. 5, when a fire or air blast occurs inside the air chamber 11, since the mechanics case 40 is divided by the partition board 42 and forms an inlet flow channel 43, fire, humidity, and harmful substances are prevented from directly entering the mechanics compartment of the mechanics case 40. Further, the detection operation of the detection elements 55 may cause the driving element 51 to operate the block plate 52 to block the air vent hole 45. The combination of these two operations effectively cuts off the supply of oxygen and prevents fire, humidity, and harmful substances from entering the mechanics compartment of the mechanics case 40 to thereby effectively protect the motor and blower assembly 41, electric components, and electronic components, and to reduce any potential damage.

Figure 6:
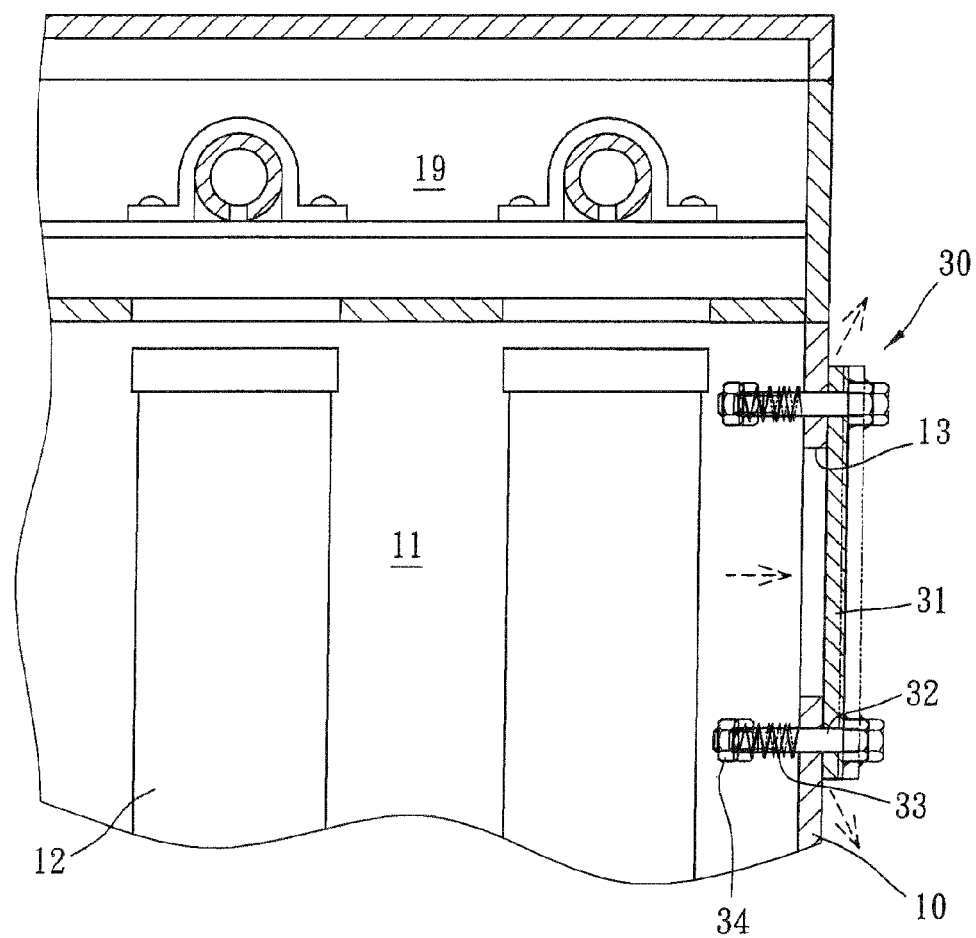
FIG. 6 is a partial cross-sectional view of the present invention, illustrating a condition where pressure is released.

As shown in FIG. 6, when an excessive pressure or air blast occurs inside the air chamber 11, in case the pressure is greater than the biasing force of the return elastic member 33s, the cover plate 31 will be pushed outward to release the gas contained in the air chamber 11 through the through hole 13 thereby realizing pressure relief. After the pressure is released, the cover plate 31 is again biased by the return elastic members 33 to return and close the through hole 13. Since the return elastic members 33 are arranged to respectively encompass the guide pins 32, the biasing forces of the return elastic members 33 and the movement of the cover plate 31 are both of the same direction in the axis of the pins so that uniform application of forces is realized and air tightness can be improved to eliminate any potential risk of undesired leakage of dust.

Figure 7:
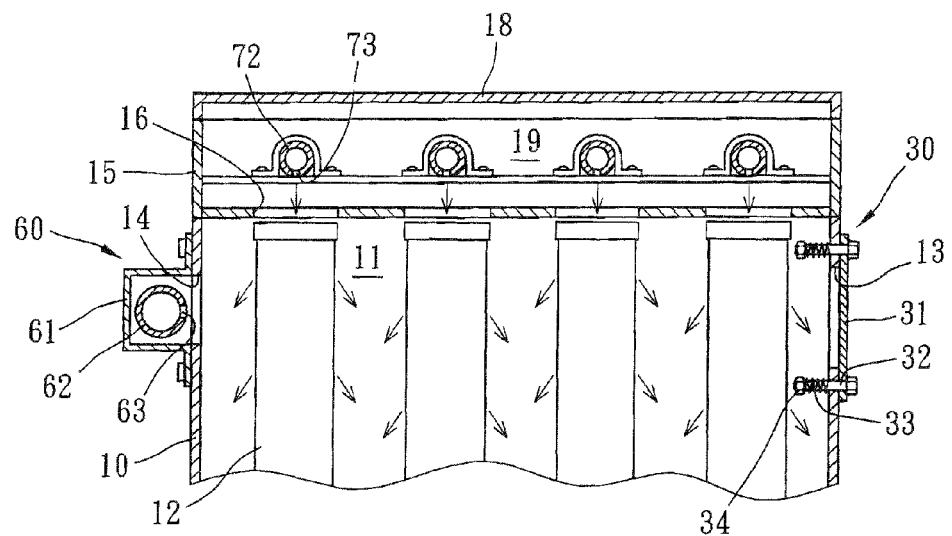
FIG. 7 is a partial cross-sectional view of the present invention, illustrating a condition where dust is being cleaned off.

As shown in FIG. 7, once the accumulation of dust on the filter cans 12 reaches a predetermined level, the pressurized air supply 71 is activated to introduce pressurized air through the air duct 72 to the spray openings 73, where the pressurized air is ejected to the filter cans 12 that respectively correspond to the air holes 16 to blow off the dusts attached to the outside surfaces of the filter cans 12, thereby cleansing the filter cans 12.

Figure 8:
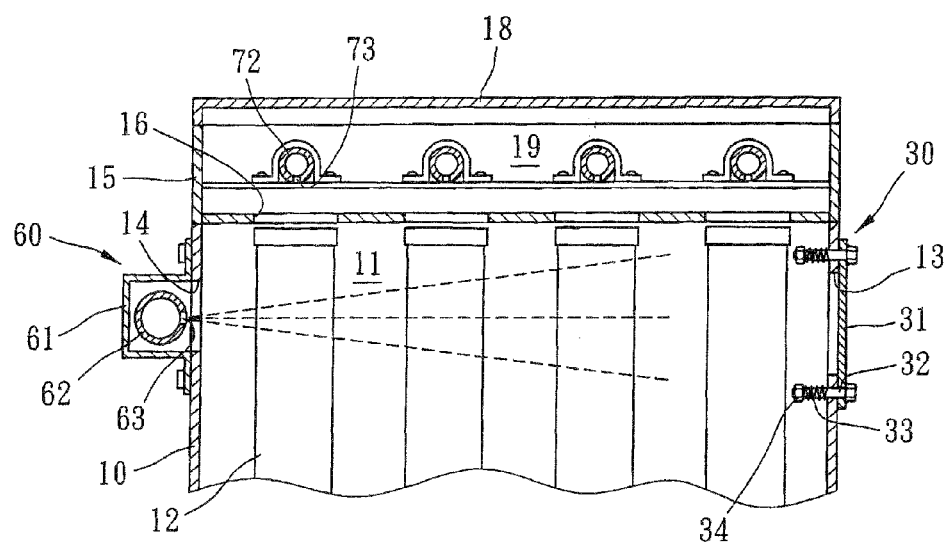
FIG. 8 is a partial cross-sectional view of the present invention, illustrating a condition where fire is being extinguished.

As shown in FIG. 8, when a fire or air blast occurs inside the air chamber 11 and is detected by the detection element 55, the fire extinguisher unit 60 will be activated to eject water that is supplied for first extinguishment purposes from the nozzles 63 of the liquid conduction tube 62 to pass through the opening 14. Since the liquid conduction tube 62 is arranged close to the upper edge of the side wall of the machine body 10, extinguishment of fire can be effectively carried out. Further, since the fire extinguisher unit 60 is set at the upper edge of the side wall of the machine body 10, rather than inside the air conduction chamber 19 as that is arranged in the prior art devices, mutual interference can be avoided and ensure smooth flow or air without undesired hindrance and may directly spray water to put off a fire outside the filter cans 12 rather than indirectly putting off fire by wetting interior of the filter cans 12 thereby significantly improving the efficiency and effectiveness of fire extinguishment.

As shown in FIGS. 2 and 4, the receiving space 24 receives the guide tube 22 that comprises the air inlet connector 23 arranged therein and thus, when the dust collection tank 25 is disposed into the receiving space 24, the coupling hole 29 may couple to the air inlet connector 23, whereby through an operation of drawing in air, a dust collection bag received in the dust collection tank 25 is acted by the air drawing operation to expand downward thereby facilitating collection of dust in the dust collection bag and increasing the capacity thereof.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A dust collection device, which comprises a machine body, a chassis, and a mechanics case;

the machine body forming therein an air chamber, the air chamber receiving a plurality of filter cans arranged therein, the machine body having a top to which an upper spacer board is mounted to close the air chamber and forming a plurality of air holes corresponding to the filter cans located inside the air chamber, the upper spacer board having a side portion forming an air guide passage corresponding to the mechanics case, the upper spacer board being covered by a top board arranged thereon to define an air conduction chamber in communication with the air chamber and the mechanics case;

the chassis being set under the machine body, the chassis comprising two side supports arranged below the machine body, the two side supports defining therebetween a receiving space, the receiving space receiving therein a dust collection tank for collecting dust;

the mechanics case being arranged at one side of the machine body, the mechanics case comprising a motor and blower assembly that generates an air flow, the mechanics case comprising a partition board at one side of the motor and blower assembly facing the machine body, the mechanics case being divided by the partition board into an inlet flow channel and an outlet flow channel, wherein the inlet flow channel corresponds to the air guide passage of the upper spacer board of the machine body, the partition board forming an air vent hole communicating between the inlet flow channel and the outlet flow channel, the partition board comprising a block unit mounted thereto to selectively block the air vent hole; and the block unit comprising a block plate, which is operated by a driving element to selectively block the air vent hole of the partition board, the block unit comprising a detection element that is arranged inside the air chamber of the machine body and coupled to the driving element.

2. The dust collection device according to claim 1, wherein the machine body forming at least one through hole in communication with the air chamber, the through hole receiving a pressure relief unit mounted thereto, the pressure relief unit comprising a cover plate that covers the through hole, the cover plate having a circumferential edge to which guide pins are mounted to extend into the machine body, each of the guide pins having an end extending into the machine body and carrying an engagement member to retain a return elastic member encompassing the pin, whereby the cover plate is biased by biasing forces of the return elastic members to tightly position on an outside surface of the machine body.

3. The dust collection device according to claim 1, wherein the machine body forms in a side wall an opening adjacent to an upper edge thereof and in communication with the air chamber, the opening receiving a fire extinguisher unit mounted thereto, the fire extinguisher unit comprising a shade outside the opening of the machine body, the shade receiving therein a liquid conduction tube adapted to communicate with a water supply, the liquid conduction tube comprising a plurality of nozzles.

4. The dust collection device according to claim 1, wherein the air conduction chamber defined by the upper spacer board of the machine body receives therein a cleaner unit, the cleaner unit comprising a pressurized air supply arranged inside the side supports of the chassis, the air conduction chamber comprising therein a plurality of air ducts connected to the pressurized air supply, the air ducts forming a plurality of spray openings corresponding to the air holes of the upper spacer board for cleaning dust off the filter cans.

5. The dust collection device according to claim 1, wherein the chassis comprises a guide tube received in the receiving space, the guide tube having an air inlet connector corresponding to the dust collection tank, the dust collection tank having an inner bottom surface on which a lower spacer board is mounted, the lower spacer board forming a plurality of through apertures, an air guide trough being formed below the lower spacer board, the air guide trough comprising a coupling hole corresponding to the air inlet connector for allowing a bottom of dust collection bag received in the dust collection tank to expand downward thereby facilitating collection of dust in the dust collection bag and improving collection capacity.

6. The dust collection device according to claim 1, wherein the mechanics case comprises an air exhaust assembly mounted to a top thereof and communicating the outlet flow channel to allow clean air to discharge outward.

7. The dust collection device according to claim 1, wherein the block unit comprises two rails that are set at opposite sides of the air vent hole of the partition board to guide a smooth and stable movement of the block plate.

* * * * *